United States Patent
Kiuchi et al.

[11] Patent Number: 6,101,719
[45] Date of Patent: Aug. 15, 2000

[54] METHOD OF MANUFACTURING ROLLING BEARINGS

[75] Inventors: Akihiro Kiuchi; Shigeru Okita; Kenji Yamamura, all of Fujisawa, Japan

[73] Assignee: NSK Ltd., Tokyo, Japan

[21] Appl. No.: 09/242,817

[22] PCT Filed: Aug. 26, 1998

[86] PCT No.: PCT/JP98/03782

§ 371 Date: Feb. 25, 1999

§ 102(e) Date: Feb. 25, 1999

[87] PCT Pub. No.: WO99/10557

PCT Pub. Date: Mar. 4, 1999

[30] Foreign Application Priority Data

Aug. 26, 1997 [JP] Japan ................ 9-243472

[51] Int. Cl.$^7$ ............................ B21K 1/02
[52] U.S. Cl. ................... 29/898.13; 29/898.14
[58] Field of Search ............ 29/898.61, 898.13, 29/898.14; 148/906

[56] References Cited

U.S. PATENT DOCUMENTS

| | | | |
|---|---|---|---|
| 5,139,584 | 8/1992 | Gantois | 148/235 |
| 5,780,165 | 7/1998 | Fukumoto et al. | 428/472.1 |

FOREIGN PATENT DOCUMENTS

| | | |
|---|---|---|
| 61-117268 | 6/1986 | Japan . |
| 1-225764 | 9/1989 | Japan . |
| 1-255656 | 10/1989 | Japan . |
| 2-22451 | 1/1990 | Japan . |
| 6-172960 | 6/1994 | Japan . |
| 8-325701 | 12/1996 | Japan . |

OTHER PUBLICATIONS

Journal of Japan Institute of Metals, vol. 50, No. 4, pp. 395–402 (Apr. 1986).
C. Jatczak, Specialty Carburizing Steels for Elevated Temperature Service, Metal Progress, pp. 70–78 (Apr. 1978).
Heat Treatment, vol. 22, No. 3, pp. 172–174 (Jun. 1982).
"Surface Hardening", The Metal Surface Finishing Society of Japan, p. 10 (Jun. 1971).
"Iron and Steel and Alloy Elements", Last Volume edited by JSPS, Steel Making No. 19 Committee, p. 696–698 (Mar. 1966).
"Special Steel Handbook", 1st Edition, edited by Denki Seikou Kenkyujo, Rikogakusya Publishing Co., Ltd., 10–21 (1 page), (1969).

*Primary Examiner*—David P. Bryant
*Assistant Examiner*—Marc W. Butler
*Attorney, Agent, or Firm*—Frishauf, Holtz, Goodman, Langer & Chick, P.C.

[57] ABSTRACT

In manufacturing a rolling bearing, at least one component of an inner ring, an outer ring, and a rolling element is manufactured from an alloy steel comprising 0.05 weight %–0.5 weight % carbon, 0.5 weight %–18 weight % chromium, 1.5 weight % or less silicon, 5 weight % or less molybdenum, 4.0 weight % or less vanadium, 4 weight % or less nickel, and 8 weight % or less tungsten, by subjecting the alloy steel to carburizing, hardening and tempering. The carburizing is carried out by vacuum carburization. In the vacuum carburization, carburizing and diffusion are carried out by introducing an acetylene-based carburizing gas in a hot atmosphere under reduced pressure, followed by hardening and tempering. The use of the vacuum carburization enables carburization with the chromium (Cr) content being 3.0 weight % or more, and even up to 18 weight %, which was difficult to achieve with the conventional gas carburization (pre-oxidation+gas carburizing).

19 Claims, 5 Drawing Sheets

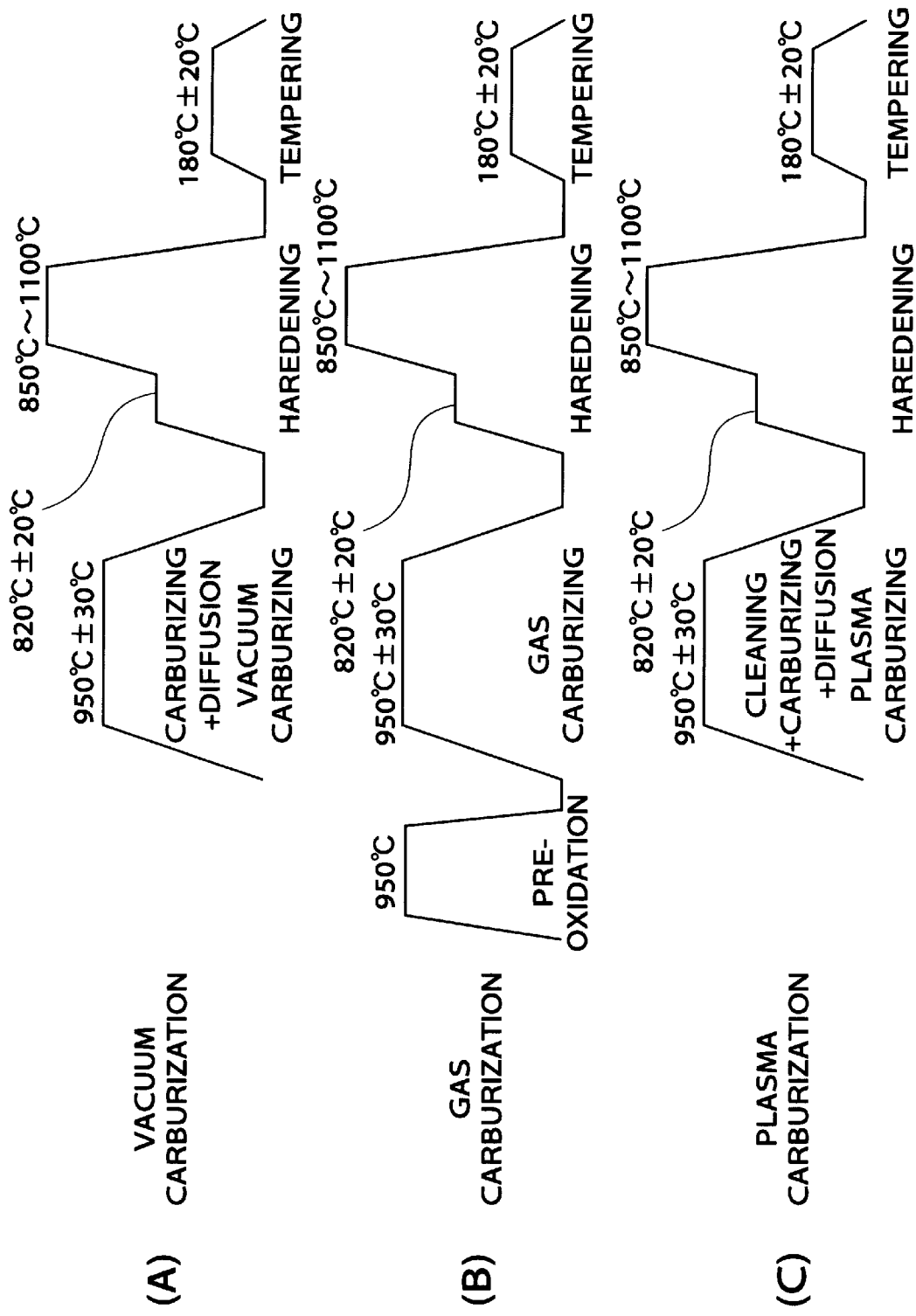

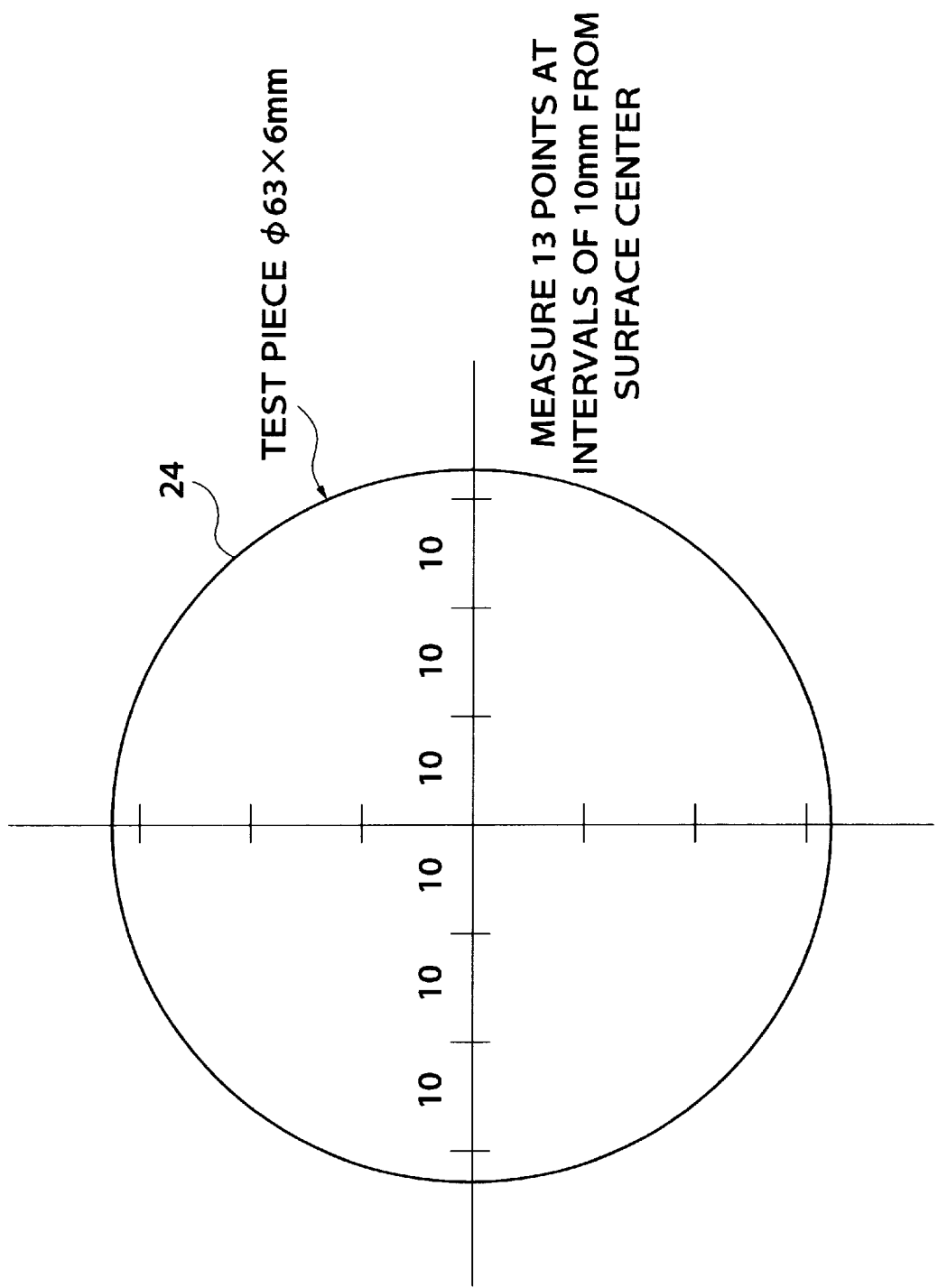

METHOD OF MANUFACTURING ROLLING BEARINGS

TECHNICAL FIELD

The present invention relates to a method of manufacturing rolling bearings which are used under severe environmental conditions such as equipment for steel works, engines of jet planes, gas turbines, and turbo chargers, and are required to have high reliability such as heat resistance, wear resistance, and core toughness.

BACKGROUND ART

In recent years, severe requirements have been imposed upon bearing materials for use at high temperatures, such as a heat-resisting carburized steel, in terms of higher temperature and higher speed operating conditions required of rolling bearings, or higher performance required of rolling bearings, which is obtained by adding core toughness and surface compressive residual stress to the rolling bearing materials.

Such a heat-resisting steel is a high alloy steel containing chromium (Cr), nickel (Ni), silicon (Si), molybdenum (Mo), vanadium (V), tungsten (W), etc. For example, there are known AISI M50 NiL as a material for use in engines of jet planes and gas turbines, and CBS 600 and Pyrowear 53 which contain Si in large amounts as materials for enhancing the heat resistance in particular.

In hardening the surface of a high alloy steel containing chromium (Cr), molybdenum (Mo), and silicon (Si) in large amounts such as stainless steel and tool steel, if ordinary gas carburization is employed, a dense oxide film is formed on the surface during carburization, or heavy intergranular oxidation occurs, making it difficult to carburize the steel using the ordinary gas carburization (cf. Journal of Japan Institute of Metals, Vol. 50, No. 4, p395–p402).

To carburize such a high alloy steel, a method has been employed, which includes carrying out pre-oxidation for forming an oxide layer on the surface of the steel in air at 955° C., before carrying out a carburizing treatment, as described in "Specialty Carburizing Steels for Elevated Temperature Service" by C. F. Jatczak; "METAL PROGRESS", p70–p78, April, 1978. The pre-oxidation makes the dense oxide film porous, and accordingly the carburizing gas can contact the surfaces of the resulting bearing (inner ring, outer ring and rolling element).

On the other hand, as a method which does not use pre-oxidation, a plasma carburizing method as disclosed, e.g., in Laid-Open Patent Publication No. 1-225764 and Laid-Open Patent Publication No. 1-255656 can be used to carburize a high alloy steel. This method is widely employed.

Further, an example in which a vacuum carburizing method is applied to stainless steel has been reported (cf. Heat Treatment, Vol, 22, No. 3, p172–p174).

According to the gas carburizing method using the pre-oxidation, however, the chromium (Cr) content is a little bit larger (particularly, if it is 3 weight % or more), the effect of the pre-oxidation becomes reduced, making it difficult to perform carburizing.

Moreover, according to the gas carburization, very small amounts of $C_2O$ and $H_2O$ contained in the gas as gas ingredients cause formation of an intergranular oxide layer on the surface of the steel material, particularly if the Si content is large, spoiling the carburizability. Si is an element that enhances the tempering softening resistance, and therefore if the resulting bearing is used in a hot environment, the presence of Si largely affects the function of the bearing.

Besides, if the contents of Cr, Mo, V, etc. of the alloy increase, a dense carbide layer is formed on the steel surface, whereby carbon which is to penetrate and diffuse into the steel base is consumed in the formation of the carbide layer and accordingly the concentration of carbon solid-solved in the steel decreases, so that carbon cannot deeply penetrate and diffuse into the steel base, which requires prolonging the carburizing time. This, however, causes further enlargement of the intergranular oxide layer on the steel surface, leading to degraded strength.

On the other hand, the plasma carburizing method which does not include pre-oxidation does not only require the provision of equipment for carrying out the vacuum carburizing method but also requires power equipment to obtain plasma discharge, which are very expensive, thus leading to an increased treatment cost.

Further, depending upon the combination of the above-mentioned elements, even if these elements are added in amounts which were conventionally not deemed to be critical, for example, if Si and V are added in amounts within a certain range, not only intergranular oxidation occurs but also an oxide reaction with Si and V occurs to cause insufficient local carburization if the gas carburization is employed.

The present inventors have diligently made studies to solve the above described problems, and as a result, have found a range within which carburizing of a high alloy steel which was difficult to perform using the conventional gas carburization can be performed, and a range within which adaptation (implementation) of carburization to a high alloy steel is possible, which was not clear according to the conventional vacuum carburizing method, by limiting ingredients of the alloy steel and adapting a vacuum carburizing method using acetylene, thus successfully solving the problems.

In particular, by employing the vacuum carburizing method using acetylene, the range of possibility of adaptation of the vacuum carburization which was conventionally not made clear has been made clear (in the conventional method, a hydrocarbon-based gas such as propane was used as the carburizing gas), and thus a method of manufacturing a bearing which is inexpensive and has high performance as compared with other methods is provided.

Thus, it is the object of the present invention to provide a method of manufacturing a rolling bearing which is capable of manufacturing a high-performance bearing formed of a heat-resisting carburized steel at a cost lower than that of the conventional method, without degradation in the strength due to formation of the intergranular oxide layer.

DISCLOSURE OF THE INVENTION

To attain the above object, the present inventors have paid attention to the manufacture using the vacuum carburizing method which does not plasma discharge or the like.

As the vacuum carburizing method, there have been made public methods described in Laid-Open Patent Publication No. 61-117268, Laid-Open Patent Publication No. 2-22451, Laid-Open Patent Publication No. 6-172960, Laid-Open Patent Publication No. 8-325701, etc. and put to actual use. No method, however, has been known, which contemplates adaptation to a high alloy steel containing elements affecting the carburizability, such as Cr, Si and V, in large amounts (e.g., Cr is contained in 3 weight % or more).

Although an example in which the vacuum carburizing method is applied to stainless steel according to SUS 403 is reported in a document (cf. Heat Treatment, Vol. 22, No. 3, p172 –p74), no contemplation is made of the influence of the alloy elements upon the carburizability at all.

On the other hand, as a method applied to more examples of adaptation of carburization to high alloy steels than the vacuum carburizing method, the plasma carburizing method can be cited. The reason why the plasma carburizing method is able to carburize high alloy steels is that, while according to the gas carburizing method and the vacuum carburizing method, carbon activated due to thermal decomposition reaction is brought into contact with the surface by thermal energy to thereby utilize equilibrium reaction of the carbon with iron, according to the plasma carburizing method the surface of a work to be processed is irradiated with argon (Ar) ions and hydrogen ($H_2$) ions (for cleaning), and carbon ions (for carburizing), which are given higher energy by plasma discharge, to thereby carry out cleaning of the work surface and carburizing thereof at the same time.

Further, on the other hand, as to the vacuum carburizing method, it has been considered to be inherently difficult to perform carburizing of high alloy steels by the vacuum carburizing method which carries out carburizing by means of an equilibrium reaction of iron with thermally decomposed carbon, similarly to the gas carburization.

Further, silicon (Si) and nickel (Ni) are added in order to enhance the heat resistance and also enhance the hardenability and rupture toughness. In this respect, however, there is known a problem that if these elements are added in large amounts, the carburizability can be spoiled, and uneven carburization can take place (cf. Surface Hardening, The Metal Surface Finishing Society of Japan, p10)

The present invention has been made with attention being paid to a method which was not conventionally studied, and its object is to manufacture and provide a high-performance bearing at a lower cost than the prior art and in a reliable manner. A method of manufacturing a rolling bearing according to the present invention is characterized by manufacturing at least one of an inner ring, an outer ring, and a rolling element from an alloy steel comprising 0.05 weight %–0.5 weight % carbon, 0.5 weight %–18 weight % chromium, 1.5 weight % or less silicon, 5 weight % or less molybdenum, 4.0 weight % or less vanadium, 4 weight % or less nickel, and 8 weight % or less tungsten, by subjecting the alloy steel to carburizing, hardening and tempering, wherein the carburizing is carried out by vacuum carburization.

A method of manufacturing a rolling bearing as claimed in claim 2 is characterized in that in the method of manufacturing a rolling bearing as claimed in claim 1, the alloy steel includes 0.15 weight %–0.5 weight % carbon, and 2.2 weight %–18 weight % chromium.

In an embodiment of the method of manufacturing a rolling bearing of the present invention, the alloy steel includes 0.05 weight %–0.5 weight % carbon, 0.5 weight %–18 weight % chromium, and 0.8 weight %–1.5 weight % silicon.

In an embodiment of the method of manufacturing a rolling bearing of the present invention, the alloy steel includes 0.05 weight %–0.5 weight % carbon, 0.5 weight %–18 weight % chromium, 0.3 weight %–1.5 weight % silicon, and 0.8 weight %–4.0 weight % vanadium.

In the embodiment of the method of manufacturing a rolling bearing of the present invention, the vacuum carburization is carried out by introducing acetylene.

According to the vacuum carburization, a carburizing gas is introduced in a heated atmosphere under vacuum (reduced pressure) to carry out carburizing of the alloy steel and diffusion of the gas into the alloy steel. As the carburizing gas, a hydrocarbon (methane)-based gas or an acetylene-based gas is introduced, and a gas flow rate and a furnace pressure are selected according to the introduced gas for the carburization and diffusion. After the carburization and diffusion, hardening and tempering are carried out. As the carburizing gas, it is preferable to use the acetylene-based gas which is a chemically unstable active gas.

The alloy steel preferably includes at least one of 5 weight % or less molybdenum (Mo), 4.0 weight % or less vanadium (V), and 8 weight % or less tungsten (W), whereby hard carbide is formed to thereby increase the tempering softening resistance as well as secure grindability.

Also preferably, the alloy steel includes 1.5 weight % or less silicon (Si), which is an element required as a deoxidizer, whereby the tempering softening resistance can be enhanced and also machinability and malleability can be secured.

Further preferably, the alloy steel includes 4 weight % or less nickel (Ni), whereby the hardenability can be enhanced to thereby enhance the toughness and secure hardness after the tempering.

BRIEF DESCRIPTION OF THE DRAWINGS

FIG. 4 is a schematic diagram showing various heat treatment conditions.

FIG. 5 is a schematic diagram showing a hardness measuring position.

BEST MODE FOR CARRYING OUT THE INVENTION

Figure 1:
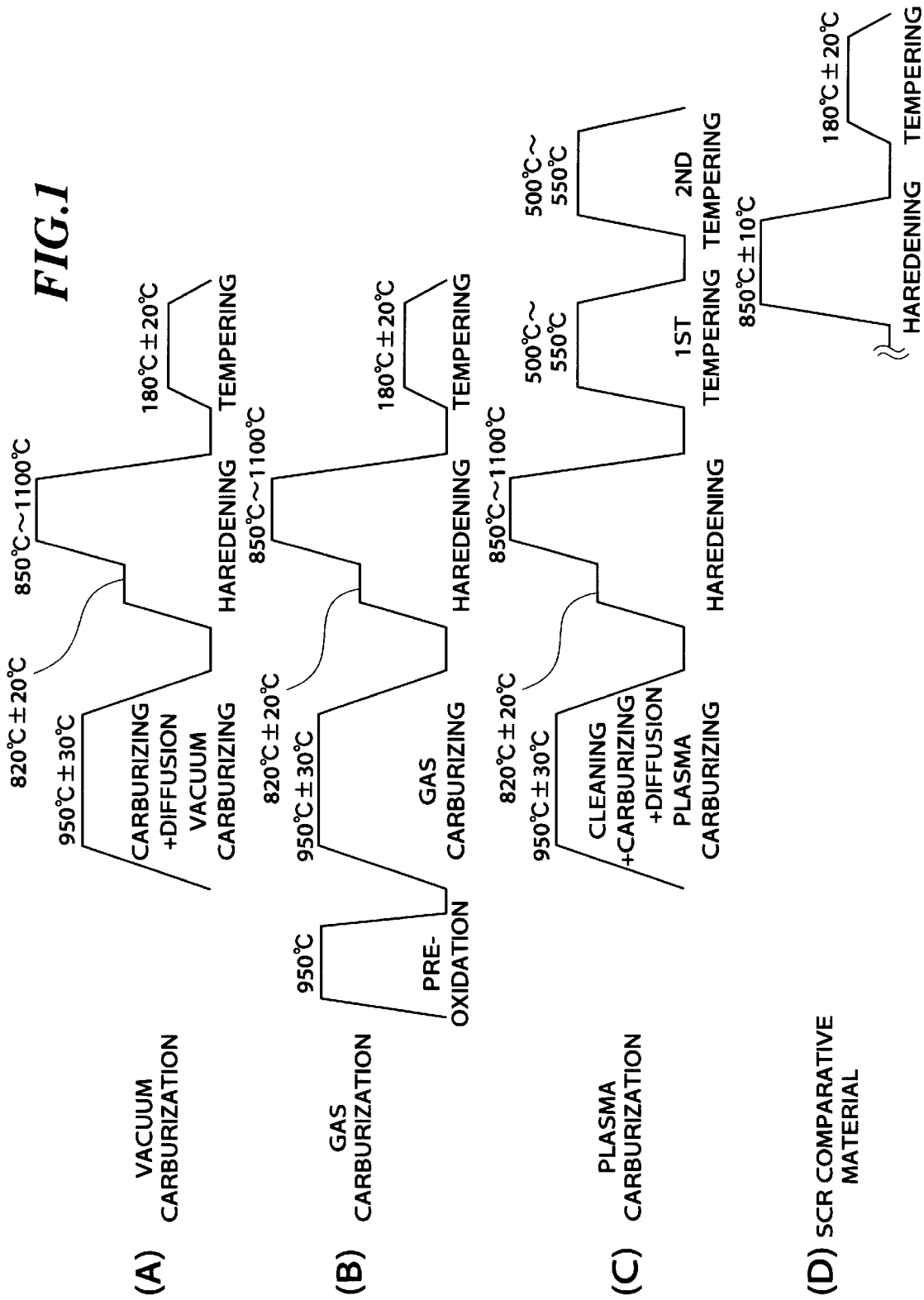
FIG. 1 is a schematic diagram showing heat treatment conditions employed in evaluation of the carburizability.

An embodiment of the method of manufacturing a rolling bearing according to the invention will be described.

In the present embodiment, in manufacturing at least one of an inner ring, an outer ring, and a rolling element that constitute a rolling bearing from an alloy steel, by subjecting the alloy steel to carburizing, hardening and tempering, the carburizing is carried out by vacuum carburization. As a result, homogeneous carburization of a high alloy steel, which was conventionally difficult to achieve without the use of a special method, can be manufactured at a low cost without requiring special equipment, thus providing a high-quality bearing.

Among vacuum carburizing methods, the vacuum carburizing method using acetylene indicated in Laid-Open Patent Publication No. 8-325701 enables setting the pressure applied at carburizing to a lower value than that in the conventional vacuum carburizing method (the conventional method: 300–700 torr using a hydrocarbon-based gas such as propane, the present invention: 1 Kpa (8 torr) or less using an acetylene gas). This can shorten the time period of the stay of the carburizing gas introduced into a heating chamber, within the furnace, and permits discharge of extra gas not taking part in the carburization, out of the furnace after thermal decomposition, thereby enabling restraint of sooting.

Further, the carburization is carried out under high vacuum (reduced pressure) (compared with the conventional method, i.e., the vacuum carburizing method using propane), $C_2O$ and $H_2O$ are not present in the carburizing atmosphere so that it can be considered that the amount of an oxide layer which spoils the carburizability is smaller.

Moreover, by setting a suitable gas flow rate (pressure) for the carburizing action by the vacuum carburization, the relationship between the formation of a carbide layer and the diffusion of the same into the steel base becomes more proportional, and by employing a vacuum (reduced pressure), it is presumed that the formation of an oxide layer can be restrained, thus enabling homogeneous carburization.

As the vacuum carburization mthod are included a method of carrying carburization by introducing methane or propane under a pressure of 700 torr or less, a method of carrying out carburization by introducing acetylene under a pressure of 1 Kpa (8 torr) or less. In the present embodiment, in view of the fact that the pressure can be made low and the amount of the carburizing gas is sufficient if it is within a range that can contribute to carburization and the addition of the carburizing gas in an amount in excess of a required amount is not desirable, for the above-mentioned reason and others, it is desirable to carry out carburization by introducing acetylene under a pressure of 1 Kpa (8 torr) or less.

As a result of adapting the vacuum carburizing method using acetylene and studying the alloy component content range in terms of carburizability through experiments, elements that affect the carburizability and restraint of unevenness of carburization and preferred content ranges of these elements have been found. The reasons why the content ranges of chemical ingredients of the steel have been limited to the preferred content ranges will be described hereunder:

Carbon (C) is an element that is needed for enhancing the hardness after hardening and tempering by making the base martensitic. The carbon content has been limited to 0.05 weight % or more in order to secure the strength required of the bearing. If the carbon content is less than 0.05 weight %, the time required for the carburizing process becomes long, resulting in degraded productivity. On the other hand, if the carbon content exceeds 0.5 weight %, the toughness is largely degraded. Therefore, the C content has been limited to 0.05 weight %–0.5 weight %.

Silicon (Si) is an element that is needed as a deoxidizer and should desirably be added in an amount of 0.1 weight % or more. Further, it is an element that enhances the tempering softening resistance, thus being effective for improving the heat resistance. On the other hand, silicon is known as an element having high affinity to oxygen, and as it is added in increased amounts, the intergranular oxide layer formed on the steel surface becomes larger in depth, and if the silicon content exceeds a certain value, the oxide layer extends even into grains so that a very dense oxide film is formed on the surface, which degrades the carburizability.

Further, the dense oxide film can be formed in an uneven manner, i.e. can be formed locally. In such a case, "uneven carburization", i.e., a phenomenon that those portions of the surface at which the oxide film is formed are not carburized can occur. A result of research by the present inventors showed that such uneven carburization and the degradation of carburizability occur at 0.8 weight % or more of the Si content in the case of the gas carburization.

According to the vacuum carburization method using acetylene, $C_2O$ and $H_2O$ which cause formation of the oxide film are not present in the carburizing atmosphere, so that the above-mentioned problem does not occur even at 0.8 weight % or more of the Si content. However, if the Si content is excessively high, it causes degradation in the machinability and malleability. This is why the upper limit of the Si content has been limited to 1.5 weight %. So far as the Si content does not exceed the upper limit, there is no occurrence of degradation in the carburizability and uneven carburization. Therefore, in the present embodiment, the Si content has been limited to a range of 0.8 to 1.5 weight %, which is questionable in the case of gas carburization.

Further, when Si is added together with vanadium (V), the Si content has been limited to a range of 0.3 to 1.5 weight % for a reason described hereinafter. In addition, the Si content should be preferably low in view of the machinability and malleability, and a range of 0.3 to 0.8 weight % of the Si content is most suitable for the workability. If Si is added in an amount of 0.3 to 0.8 weight % or more, good tempering softening resistance can be obtained. However, if Si is added in an amount of 1.5 weight % or more, the machinability can be largely degraded.

Chromium (Cr) does not only act to enhance the hardenability and strengthen the base, but also serves to cause precipitation of carbide in the surface layer due to carburization to thereby prolong the rolling fatigue life and enhance the wear resistance as well as the corrosion resistance. To obtain these effects, it is necessary to add Cr in an amount of at least 0.5 weight %. However, if the Cr content exceeds 18 weight %, the workability can be degraded, leading to an increased manufacturing cost. Therefore, the upper limit of the Cr content has been set to 18 weight %. Thus, the Cr content has been limited to a range of 0.5 to 18 weight %.

Vanadium (V) acts to increase the tempering softening resistance and also form hard carbide. More specifically, V forms very fine and very hard VC carbide due to carburization, which is dispersed in the alloy base to strenthen the same, and is thus an element which is effective for enhancing the wear resistance and prolonging the rolling fatigue life. However, if V is added in an excessive amount such that the V content exceeds 4.0 weight %, not only the machinability can be degraded but also the resulting product is expensive. Therefore, the upper limit has been limited to 4.0 weight %.

It is known that elements that form carbide generally tend to act to increase the amount of C in its neighborhood to reduce the carburized depth (carbon that is to be dispersed is used in part for formation of carbide and accordingly not dispersed deeply into the base). Although V is an element that forms carbide, it is known as an element that does not have a large influence upon C in its neighborhood and hence does not largely affect the carburizability ("Iron Steel And Alloy Elements", Last Volume edited by JSPS, Steel Making No.19 Committee, p697).

However, the present inventors have found that if an alloy steel which contains a certain amount of silicon (Si) together with vanadium (V) is subjected to gas carburization, the carburizability and unevenness of carburization are influenced. The V and Si contents that can thus cause an influence are 0.8 weight or more % V and 0.3 weight % or more Si. If either of the elements is contained in less than the respective indicated amount, there is no problem.

Conventionally, Si is known as an element that forms an intergranular oxide layer and a dense oxide film layer depending upon its content, due to its high affinity to oxygen. The formation of a dense oxide film that is considered to be critical for the gas carburization can occur if the Si content is approximately 1 weight %, according to a document (Heat Treatment, Vol. 37, No. 4, p229). However, it has been found that even if the Si content is 0.3 weight %, if V is contained in an amount of 0.8 weight % or more, it is critical for the gas carburization.

The reason for this is presumed to be that since V is also an element having high affinity to oxygen, V alone does not have a significant influence, but coacts with Si simultaneously contained in a small amount such that small amounts of $C_2O$ and $H_2O$ present in the gas carburizing atmosphere form factors for local formation of an oxide film, which is critical for the gas carburization. Therefore, the lower limit of a preferable range of the V content should be 0.8 weight % or more at which the gas carburization is difficult to occur.

As an element or elements that act to form hard carbide and increase the tempering softening resistance, one or at least two of molybdenum (Mo), tungsten (W) and vanadium (V) should be preferably added if required. However, if one or at least two of these elements are added in excessive amounts, the above effect becomes saturated, leading to an increased cost and the resulting product is difficult to machine. Therefore, it is preferable that molybdenum (Mo) should be added in an amount of 5 weight % or less, tungsten (W) 8 weight % or less, and vanadium (V) 4.0 weight % or less.

Nickel (Ni) is effective as an element that acts to enhance the hardenability as well as the toughness and is added if required. However, if its content exceeds 4 weight %, its effect cannot be further enhanced, and rather retained austenite can be formed in large amounts to degrade the hardness after tempering. Therefore, the upper limit of the Ni content has been limited to 4 weight %.

The elements Cr, V, and Si form inactive oxide films.

EXAMPLES (I) A First Embodiment of the Rolling Bearing Manufacturing Method will be now Described.

Test pieces each having a size of φ 40 mm×10 mm were prepared from various materials shown in Table 1, and the prepared test pieces were subjected to carburization under various conditions, and evaluated in respect of carburizability.

In an evaluation of the carburizability, SCR comparative pieces which are identical in size and shape with pieces to be evaluated was subjected to carburizing using the same carburizing charges (methods) as those used for the pieces to be evaluated, followed by hardening and tempering, and a hardness gradient from the surface of the comparative pieces was examined, to evaluate the pieces to be evaluated, based upon a ratio in total carburized layer depth between the comparative pieces and the pieces to be evaluated. The SCR comparative pieces are formed of materials being the same in carbon (C) concentration as the pieces to be evaluated. That is, the evaluation of the carburizability was carried out using the ratio in total carburized layer depth between the SCR comparative pieces and the pieces to be evaluated at the same base carbon concentration. FIG. 1 is a view showing heat treatment conditions employed in the evaluation of the carburizability.

In the case of vacuum carburization, vacuum carburization (carburizing+diffusion) was carried out at 950° C.±30° C., hardening at 820° C.±20° C. and 850° C. to 1100° C., and tempering at 180° C.±20° C. (see FIG. 1(A)).

In the case of gas carburization, pre-oxidation was carried out at 950° C., gas carburization (carburizing+diffusion) at 950° C.±30° C., hardening at 820° C.±20° C. and 850° C. to 1100° C., and tempering at 180° C.±20° C. (see FIG. 1 (B)).

In the case of plasma carburization, plasma carburization (cleaning+carburizing+diffusion) was carried out at 950° C.±30° C., hardening at 820° C.±20° C. and 850° C. to 1100° C., first tempering at 500° C. to 550° C., and second tempering at 500° C. to 550° C. (see FIG. 1(C)).

In the case of the SCR comparative pieces, the same

TABLE 1

| | SYMBOL | STEEL TYPE | C | Si | Mn | Cr | Mo | W | V | Ni | CARBURIZING METHOD | CARBURIZING GAS | CARBURIZATION RATIO | FATIGUE STRENGTH (Kgf/mm$^2$) | COST |
|---|---|---|---|---|---|---|---|---|---|---|---|---|---|---|---|
| PRESENT INVENTION EXAMPLES | A | 1 | 0.2 | 0.2 | 0.3 | 2.2 | 0.2 | — | — | — | VACUUM CARBURIZATION | ACETYLENE | 1.2 | 85 | ○ |
| | B | 2 | 0.2 | 0.4 | 0.7 | 3 | 0.5 | — | — | — | | PROPANE | 1.2 | 88 | |
| | C | 3 | 0.4 | 0.4 | 0.4 | 4 | 0.9 | — | — | — | | ACETYLENE | 1.22 | 87 | |
| | D | 4 | 0.4 | 0.8 | 0.5 | 5 | 0.5 | — | — | — | | PROPANE | 1.18 | 88 | |
| | E | 5 | 0.4 | 0.5 | 0.3 | 8 | 1 | — | — | — | | ACETYLENE | 1.1 | 86 | |
| | F | 6 | 0.5 | 0.4 | 0.4 | 13 | 0.7 | — | — | — | | ACETYLENE | 1.02 | 88 | |
| | G | 7 | 0.2 | 0.2 | 0.4 | 15 | 1.2 | — | — | — | | ACETYLENE | 0.92 | 85 | |
| | H | 8 | 0.3 | 0.2 | 0.4 | 18 | 0.5 | — | — | — | | ACETYLENE | 0.85 | 82 | |
| COMPARATIVE EXAMPLES | I | 1 | 0.2 | 0.2 | 0.3 | 2.2 | 0.2 | — | — | — | GAS CARBURIZATION WITH PRE-OXIDTION | Rx + PROPANE | 1.05 | 70 | ○ |
| | J | 2 | 0.2 | 0.4 | 0.7 | 3 | 0.5 | — | — | — | | Rx + PROPANE | 0.8 | 68 | |
| | K | 3 | 0.4 | 0.4 | 0.4 | 4 | 0.9 | — | — | — | | Rx + PROPANE | 0.2 | 62 | |
| | L | 4 | 0.4 | 0.8 | 0.5 | 5 | 0.5 | — | — | — | | Rx + PROPANE | 0.1 | 60 | |
| COMPARATIVE EXAMPLES | M | 8 | 0.3 | 0.2 | 0.4 | 18 | 0.5 | — | — | — | PLASMA CARBURIZATION | PROPAN + PRASMA DISCHARGE | 0.9 | 85 | x |
| PRESENT INVENTION EXAMPLES | N | M50NiL | 0.15 | 0.2 | 0.3 | 4 | 4 | — | 1.21 | 3.51 | VACUUM CARBURIZATION | ACETYLENE | 1.15 | | |
| | O | SUS420J2 | 0.3 | 0.6 | 0.7 | 13 | — | — | — | — | | ACETYLENE | 1.12 | | |
| COMPARATIVE EXAMPLES | T | M50NiL | 0.15 | 0.2 | 0.3 | 4 | 4 | — | 1.21 | 3.51 | GAS CARBURI-ZATION WITH PRE-OXIDTION | Rx + PROPANE | 0.18 | | |
| | U | SUS420J2 | 0.3 | 0.6 | 0.7 | 13 | — | — | — | 3.5 | | Rx + PROPANE | 0.1 | | |
| PRESENT INVENTION EXAMPLES | P | 9 | 0.4 | 0.2 | 0.3 | 4.2 | 0.2 | 8 | — | — | VACUUM CARBURIZATION | ACETYLENE | 1.2 | | |
| | Q | 10 | 0.3 | 0.4 | 0.4 | 8 | 3 | — | 4 | — | | ACETYLENE | 1.1 | | |
| PRESENT INVENTION EXAMPLES | R | 11 | 0.4 | 1.5 | 0.7 | 13 | 1 | — | — | — | VACUUM CARBURIZATION | ACETYLENE | 1.15 | | |
| | S | 12 | 0.2 | 0.5 | 1 | 8 | 0.3 | — | — | 3.5 | | ACETYLENE | 0.95 | | | conditions were employed as those employed in the vacuum carburization and the gas carburization up to the carburizing step, but in the following hardening and tempering steps hardening was carried out at 850° C.±10° C., and tempering at 180° C.±20° C. (see FIG. 1(D)).

In examples A to H (the chromium (Cr) content is 2.2 to 18 weight %) obtained by the vacuum carburization, shown in Table 1, the carburizability was not largely impaired as compared with the SCR comparative pieces.

In the case of test pieces which were prepared by being subjected to pre-oxidation in an air atmosphere at 950° C., followed by gas carburization in an inert (RX) gas (comparative examples I to L), the carburizability was impaired to an increased degree as the Cr content increases from 2.2 weight %, and in the comparative example K with the Cr content of 4 weight %, the carburizability was greatly impaired.

Therefore, approximately 2.2 weight % should be the upper limit of the Cr content in the case of the gas carburization. The comparative pieces used for evaluation of the carburizability are formed of SCR materials having the same carbon (C) concentration as those of the respective pieces to be evaluated, and was subjected to pre-oxidation using the same charges as those used for the latter, then subjected to gas carburization using the same charges as those for the latter, and evaluated in respect of the carburizability, similarly to the above.

Figure 2:
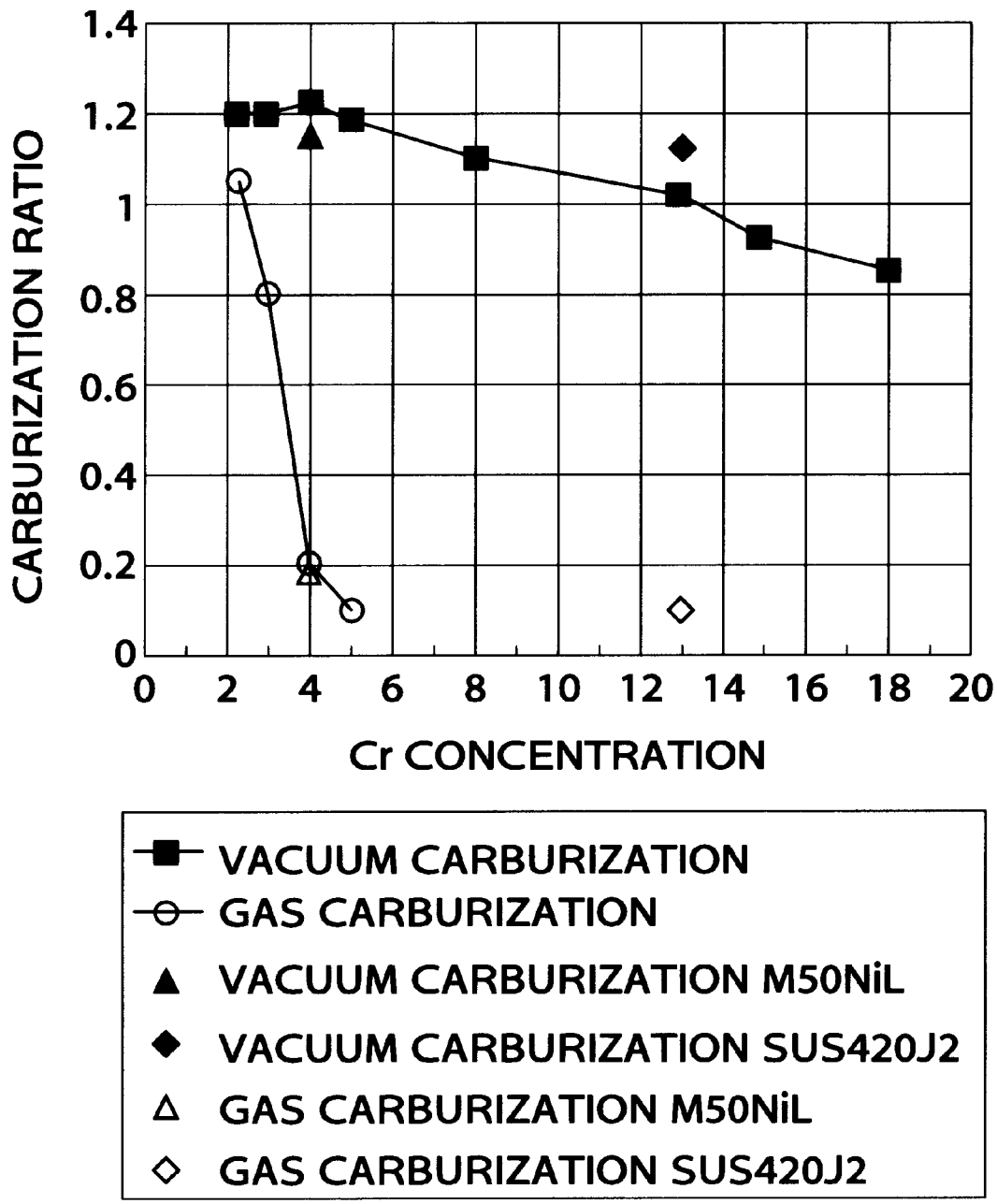
FIG. 2 is a graph showing a ratio of carburization relative to concentration of chromium (Cr) obtained by carrying out comparative carburization using a SCR comparative material.

The chemical compositions of SCR steels employed for the comparative pieces are shown in Table 2:

FIG. 2 is a view showing a carburization ratio characteristic relative to the chromium (Cr) concentration obtained by comparative carburization of SCR comparative pieces. In the gas carburization, the carburizability is impaired when the Cr concentration is 3 weight % or more, whereas in the vacuum carburization the carburizability is not impaired unless the Cr concentration exceeds 18 weight %. Further, even M50Nil and SUS420J2, which are difficult to carburize by the gas carburization, show sufficient carburizability when they are subjected to the vacuum carburization.

Then, the fatigue strength was evaluated by means of a fatigue test. In the fatigue test, test rings according to NU240 were prepared from the steel types 1–8 in Table 1 and subjected to carburizing, hardening and tempering using the same charges as those used for the respective examples subjected to the evaluation of the carburizability. Then, the thus heat treated test rings were evaluated immediately after the heat treatment without being worked such as grinding, to examine the influence of the presence of an intergranular oxide layer.

Figure 3:
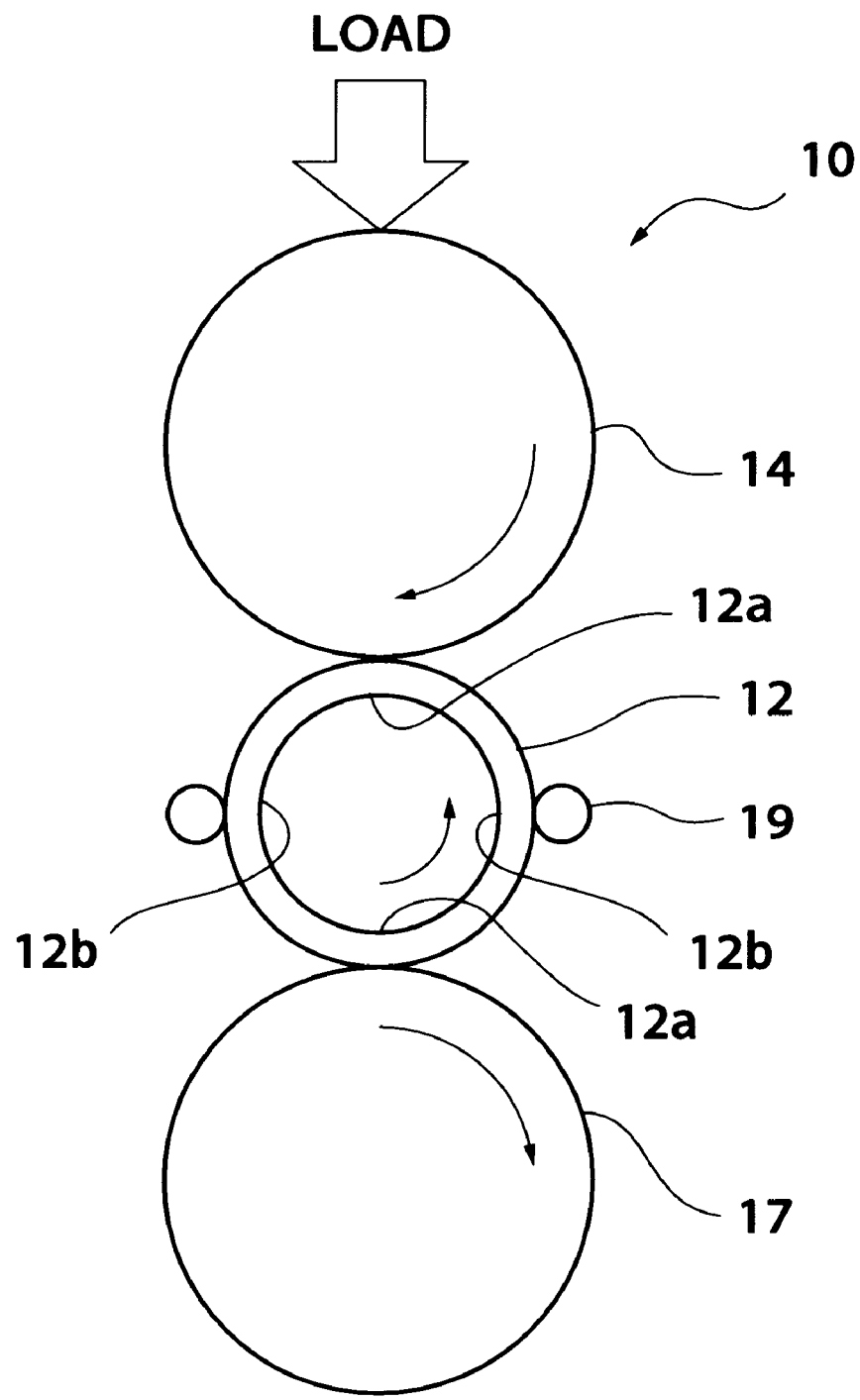
FIG. 3 is a schematic diagram showing the construction of a testing machine for carrying out a fatigue test.

FIG. 3 is a view showing the schematic construction of a tester used to conduct the fatigue test. The fatigue tester 10 is comprised of a loading roll 14 and a driving roll 17 for rotatably supporting a test ring 12 in a fashion sandwiched therebetween, and support rolls 19 for supporting the test ring 12 at its outer periphery. In the fatigue test, the test ring 12 was loaded by the loading roll 14, while the driving roll 17 was rotated to rotatively drive the test ring 12, the rotational speed N of the driving roll 17 being set to 1000

TABLE 2

|  | STEEL TYPE | C | Si | Mn | Cr | Mo | W | V | Ni |
|---|---|---|---|---|---|---|---|---|---|
| COMPARATIVE STEELS | 1 ~ 12 M50NiL SUS420J2 | 0.15 ~ 0.5 | 0.25 | 0.85 | 1.1 | 0.01 | — | — | 0.05 |

From the above indicated examples and comparative examples, it is learned that while the conventional gas carburization (pre-oxidation+gas carburizing) with the chromium (Cr) content being 3 weight % or more was difficult to carry out, the vacuum carburization can be carried out with the chromium (Cr) being up to 18 weight %.

Although plasma carburization was carried out using the same type of steel as the example H (comparative example M), the treatment is more costly as compared with the vacuum carburization.

Further, examples N and O in which steels of known types, i.e. M50NiL and SUS420J2 as comparative types of steel, which were conventionally considered to be difficult to carburize, were subjected to vacuum carburization, showed sufficient carburizability, as compared with cases where the same types of steel were subjected to the conventional gas carburization (pre-oxidation+gas carburizing) (comparative examples T and U).

Examples P, Q, R, and S showed that if chromium (Cr), molybdenum (Mo), vanadium (V), and tungsten (W) are contained within the range of the present embodiment, the carburizability is not heavily impaired. The examples R and S with the contents of chromium (Cr), silicon (Si), and nickel (Ni) falling within the range of the present embodiment showed carburizability which is not heavily impaired.

rpm, and a number of turns of 1×106 was set as a fatigue limit. When the test is conducted with the loading roll 14 being loaded, the test ring should be cracked at portions of the inner peripheral surface thereof at which the maximum stress (tensile) is generated. The fatigue strength is indicated by a value of stress corresponding to the fatigue limit, and results of the test are shown in Table 1.

More specifically, when the test ring is rotated under a loaded condition, the maximum tensile stress is generated at the inner peripheral surface of the ring 12 at two locations 12a thereof corresponding to the points of contact with the loading roll 14 and the driving roll 17, so that cracking occurs at the two locations. The fatigue strength is indicated by a value of stress at these locations assumed when the ring reached the fatigue limit. The stress value is calculated from the load, the ring diameter, and the ring thickness.

Further, compressive stress is generated at the inner peripheral surface of the ring 12 at two locations 12b thereof corresponding to the points of contact with the support rolls 19.

The examples I to L subjected to the gas carburization showed smaller fatigue strength as compared with the examples A to H subjected to the vacuum carburization. This is considered to be because since the gas carburization was carried out, an intergranular oxide layer remained on the surface.

(II) A Second Embodiment of the Rolling Bearing Manufacturing Method will be now Described.

Test pieces each having a size of ϕ 63 mm×6 mm were prepared from various types of steel shown in Table 3, and the prepared test pieces were subjected to a heat treatment comprising carburizing, hardening, and tempering under various conditions shown in Table 4 and FIG. 4. Examples and comparative examples thus obtained were compared as to the occurrence of uneven carburization (carburizability), and a thrust life test was conducted on the examples and the comparative examples while they were lubricated with foreign matter, followed by a comparison therebetween. While in the first embodiment tempering was carried out twice (500° C. to 550° C.) in the plasma carburization, in the second embodiment low-temperature tempering (180° C.±20° C.) was carried out only once.

In the thrust life test, life tests were conducted at a semi-high temperature (130° C.) and at a room temperature (approximately 25° C.). As the testing machine, a thrust type testing machine was used as described in "Special Steel Handbook", 1st Edition, edited by Denki Seikou Kenkyujo, issued by Rikogakusya Publishing Co., Ltd., May 25, 1969).

Life Test Testing Conditions:

Surface Pressure: 4900 Mpa

Rotational Speed: 1000 rpm

Lubricant: #150 Turbine Oil #68 Turbine Oil

Mixed Foreign Matter:

Chemical Composition: $Fe_3C$-based Iron

Hardness: HRC52

Grain Size: 74–147μm

Mixed Amount: 300 ppm in the lubricant oil

FIG. 5 is a view showing the hardness measuring position. To evaluate the unevenness of carburization (carburizability), test pieces 24 which were subjected to carburizing, hardening, and tempering under various conditions were each measured in respect of hardness at totally 13 points spaced from each other at intervals of 10 mm from the center of the surface (see FIG. 5). Then, the difference between the maximum value and the minimum value of the measured hardness was obtained as a measure to find uneven carburization.

This method was employed since when the carbon

TABLE 3

|  | SYMBOL | STEEL TYPE | C | Si | Mn | Cr | Mo | W | V | Ni | CARBURIZING METHOD | CARBURIZING GAS |
|---|---|---|---|---|---|---|---|---|---|---|---|---|
| PRESENT INVENTION EXAMPLES | E1 | 2 | 0.2 | 0.8 | 0.7 | 1.2 | — | — | — | — | VACUUM CARBURIZATION | ACETYLENE |
|  | E2 | 3 | 0.35 | 1.5 | 1.0 | 2.1 | 0.5 | — | — | — |  |  |
|  | E3 | 4 | 0.5 | 1.0 | 0.3 | 1.0 | 1.5 | 4 | — | 4 |  |  |
|  | E4 | 5 | 0.15 | 1.2 | 0.4 | 0.5 | 5 | — | 4 | — |  |  |
|  | E5 | CBS600 | 0.2 | 1.1 | 0.6 | 1.5 | 1 | — | — | 0.2 |  |  |
|  | E6 | 11 | 0.3 | 1.5 | 1.2 | 18 | — | — | — | — |  |  |
| COMPARATIVE EXAMPLES | E7 | 1 | 0.3 | 0.7 | 1 | 0.9 | — | — | — | — | GAS CARBURIZATION | Rx + PROPRANE |
|  | E8 | 2 | 0.2 | 0.8 | 0.7 | 1.2 | — | — | — | — |  |  |
|  | E9 | 11 | 0.3 | 1.5 | 1.2 | 18 | — | — | — | — |  |  |
|  | E10 | 12 | 0.3 | 0.2 | 0.9 | 0.8 | — | — | — | — | WITH PRE-OXIDTION |  |
| COMPARATIVE EXAMPLE | E11 | 3 | 0.35 | 1.5 | 1.0 | 2.1 | 0.5 | — | — | — | PLASMA CARBURIZATION | PROPANE + PLASMA DISCHARGE |

TABLE 4

| SYMBOL | STEEL TYPE | HEAT TREATMENT | CARBURIZABILITY | ΔHRC | $L_{10}$ LIFE (×10⁶) SEMI-HIGH TEMPERATURE | $L_{10}$ LIFE (×10⁶) ROOM TEMPERATURE | COST |
|---|---|---|---|---|---|---|---|
| E1 | 2 | A | ○ | 0.2 | 18.8 | 105 | ○ |
| E2 | 3 | A | ○ | 0.3 | 22.4 | 140 |  |
| E3 | 4 | A | ○ | 0.3 | 20.5 | — |  |
| E4 | 5 | A | ○ | 0.2 | 21.1 | — |  |
| E5 | CBS600 | A | ○ | 0.3 | 20.3 | — |  |
| E6 | 11 | A | ○ | 0.2 | 23.1 | — |  |
| E7 | 1 | B | ○ | 0.3 | 12.5 | — |  |
| E8 | 2 | B | x | 16.4 | 1.8 | 4.3 |  |
| E9 | 11 | B | x | 12 | 1.1 | 6.2 |  |
| E10 | 12 | B | ○ | 0.2 | 8.5 | 74.1 |  |
| E11 | 3 | C | ○ | 0.3 | 21.9 | — | x | content is low, the hardness is reduced due to degraded carburizability (occurrence of uneven carburization). In Table 4, the carburizability is indicated by X if uneven carburization occurred, and by ○ if no uneven carburization occurred, together with the hardness difference (ΔHRC).

Then, the test pieces thus subjected to the examination of uneven carburization (carburizability) each had the surface thereof scalped by 50 μm to adjust the roughness of the outermost surface, followed by conducting a life test thereon.

As shown in Tables 3 and 4, in a comparative example E7 subjected to the gas carburization, the Si content was 0.7 weight % less than 0.8 weight %, and therefore no uneven carburization occurred. However, in a comparative example E8 similarly subjected to the gas carburization, the Si content was 0.8 weight % or more, and therefore uneven carburization occurred with local softening.

As a result, the semi-high temperature life test showed a shorter life as compared with the comparative example E7. After completion of the test, the hardness of the perimeter of an exfoliated portion of the test piece was measured to find that the hardness of the perimeter is greatly reduced to show degraded carburizability.

In contrast thereto, in a comparative example E1 formed of the same type of steel as the comparative example E8 but subjected to the vacuum carburization, no uneven carburization occurred and also the semi-high temperature life test showed a long life. Further, none of an example E2 with the Si content being the upper limit, an example E3 with high W and Ni contents, and an example E4 with high Mo and V contents none of showed uneven carburization, and the semi-high temperature life test showed long lives.

Further, the comparative example E7 which was subjected to the gas carburization and showed no uneven carburization showed a little bit shorter life as a result of the semi-high temperature life test, as compared with the examples E1, E2, E3, E4, E5, and E6. This is considered to be because as a result of examining the test pieces of the comparative example E7 and the above examples, the comparative example E7 had an intergranular oxide layer formed on the surface due to the gas carburization, and the intergranular oxide layer remained in part on the surface even after the scalping which had an insufficient scalping amount for the intergranular oxide layer, leading to such a shorter life.

Further, comparing between the comparative example E7 and a comparative example E10 which were both subjected to the gas carburization and showed no uneven carburization, the comparative example E10 showed a little bit shorter life. This is considered to be because the comparative example E10 has a less Si content and hence smaller tempering softening resistance, so that the semi-high temperature life test of the same example showed such a shorter life.

Further, none of examples which were subjected to the acetylene vacuum carburization had any abnormal layers such as an intergranular oxide layer found on their surfaces. From this result, it is learned that these examples subjected to the acetylene carburization did not have carburizability thereof greatly impaired and have no fear of occurrence of abnormal layers on their surfaces even in comparison with the gas carburization.

Next, in the example E6 which is formed of a steel type 11 with the Cr content being the upper limit, it is learned that there is no problem of occurrence of uneven carburization and shortening of the life. However, a comparative example E9 which was subjected to the gas carburization, showed degraded carburizability, although pre-oxidation was carried out before the carburization. This comparative example did not have local unevenness of carburization but had almost its entire surface uncarburized.

A comparative example E11 is formed of the same type of steel as the example E2 but was subjected to the plasma carburization. Although the comparative example E11 has the same alloy elements as the example E2, it had no occurrence of uneven carburization and a good result of the life test. However, the plasma equipment is costly, and the treatment cost is higher as compared with the vacuum carburization.

As the example E5, results of use of CBS600 which is an existent type of steel with a high Si content are shown. No occurrence of uneven carburization was found, and also a good result of the life test was obtained. In the life test of the above examples and comparative examples, assuming that they are to be used under high temperature environment, the semi-high temperature life test was conducted in order to examine the influence of Si upon the tempering softening resistance.

Further, results of a life test conducted under room temperature environment under which the influence of elements having tempering softening resistance such as Si cannot be easily perceived are also shown in Table 3 and Table 4. Comparative examples E8 and E9 which had occurrence of uneven carburization and degraded hardness showed short lives, similarly to the results of the semi-high temperature life test. However, comparing between the comparative example E10 which has a low Si content of 0.2 weight % and the examples E1 and E2 which have relatively high Si contents and were subjected to the acetylene carburization, the comparative example E10 which was subjected to the gas carburization showed not so a large difference in the life from lives of the examples E1 and E2 as results of the room temperature life test, as compared with the results of the semi-high temperature life test, even though the intergranular oxide layer remained on the surface of the alloy steel of the example E10 due to the gas carburization. Also from this result, it is learned that the addition of Si largely influences the tempering softening resistance.

(III) A Third Embodiment of the Rolling Bearing Manufacturing Method will be now Described.

Preparation of test pieces, testing and evaluation were carried out in similar manners to those of the second embodiment, and steel types employed, heat treatments employed, and results of the evaluation are shown in Table 5 and Table 6.

TABLE 5

| | SYMBOL | STEEL TYPE | C | Si | Mn | Cr | Mo | W | V | Ni | CARBURIZING METHOD | CARBURIZING GAS |
|---|---|---|---|---|---|---|---|---|---|---|---|---|
| PRESENT | E12 | 6 | 0.3 | 0.3 | 1.5 | 1 | — | — | 0.8 | | VACUUM | ACETYLENE |
| INVENTION | E13 | 7 | 0.35 | 0.4 | 1 | | 1.5 | 0.1 | — | 1.0 | — | CARBURI- |
| EXAMPLES | E14 | 8 | 0.4 | 1.5 | 0.4 | 18 | 0.3 | — | 4.0 | — | ZATION | |
| COMPARATIVE | E15 | 6 | 0.3 | 0.3 | 1.5 | 1.0 | — | — | 0.8 | — | GAS | Rx + PROPANE |

TABLE 5-continued

| | SYMBOL | STEEL TYPE | C | Si | Mn | Cr | Mo | W | V | Ni | CARBURIZING METHOD | CARBURIZING GAS |
|---|---|---|---|---|---|---|---|---|---|---|---|---|
| EXAMPLES | E16 | 9 | 0.35 | 0.3 | 0.6 | 0.8 | 0.5 | — | 0.7 | — | CARBURIZATION | |
| | E17 | 10 | 0.3 | 0.2 | 1.5 | 1.5 | — | — | 0.8 | — | | |
| | E18 | 8 | 0.4 | 1.5 | 0.4 | 18 | 0.3 | — | 4.0 | — | | |

TABLE 6

| | STEEL TYPE | HEAT TREATMENT | CARBURIZABILITY | ΔHRC | $L_{10}$ LIFE (×10$^6$) SEMI-HIGH TEMPERATURE |
|---|---|---|---|---|---|
| E12 | 6 | A | ○ | 0.3 | 25.5 |
| E13 | 7 | A | ○ | 0.3 | 28.1 |
| E14 | 8 | A | ○ | 0.2 | 29.3 |
| E15 | 6 | B | x | 12.9 | 2.8 |
| E16 | 9 | B | ○ | 0.5 | 15.3 |
| E17 | 10 | B | ○ | 0.4 | 14.2 |
| E18 | 8 | B | x | 6.7 | 3.8 |

From Table 5 and Table 6, it is learned that a comparative example E15 which was subjected to the gas carburization had uneven carburization since it has a Si content of 0.3 weight % and a V content of 0.8 weight %. Therefore, the semi-high temperature life test showed a short life. However, comparative examples which have either the Si content or the V content falling outside the range of the present invention, i.e. a comparative example E16 (the V content falls outside the range of the present invention) and a comparative example E17 (the Si content falls outside the range of the present invention) had no uneven carburization and of which the semi-high temperature life test showed longer lives as compared with the comparative example E15. As to the comparative example E15, the hardness of the perimeter of an exfoliated portion of the test piece was measured to find that the hardness of the perimeter is greatly reduced, showing degraded carburizability.

In contrast thereto, an example E12 which is formed of the same type of steel as the comparative example E15 but has the contents of alloy component elements falling within the range of the present invention had no occurrence of uneven carburization and showed a longer life as a result of the semi-high temperature life test. Further, examples E13 and E14 which have high Si and V contents falling within the range of the present invention were both free of uneven carburization and showed long lives as results of the semi-high temperature life test. Then, comparing results of the life test between the comparative examples E16 and E17 which were subjected to the gas carburization and the examples E12, E13, and E14, the comparative examples E16 and E17 showed slightly shorter lives. This is considered to be for the same reason as in the second embodiment, that is, the intergranular oxide layer remained on the surface, leading to a shortened life, as a result of examination of the comparative examples E16 and E17 and the examples E12, E13, and E14.

No abnormal layer such as an intergranular oxide layer was found on the surface of any of the examples which were subjected to the acetylene vacuum carburization. From this result, it is learned that these examples subjected to the acetylene carburization did not have carburizability thereof greatly degraded and have no fear of occurrence of abnormal layers on their surfaces even in comparison with the gas carburization.

Further, it is learned that even if the Si content is smaller as compared with the first embodiment, Si coacts with the V content such that even if Si is added in an amount almost equal to the lower limit of the range of the present invention, it is critical or problematic for the conventional gas carburization.

Moreover, in a comparative example E18 which is formed of the same type of steel as the example 14 but was subjected to the gas carburization, since the Cr content is high, even though pre-oxidation was carried out before the carburization, a result of low carburizability over almost the entire surface was obtained.

Further, comparing the examples E1 to E5 and the examples E12 to E14, the examples E12 to E14 are slightly longer in life than the examples E1 to E5. This is because, as additional elements of the examples E12 to E14, Si, which has an effect upon the tempering softening resistance, and V, which has effects upon the tempering softening resistance and the wear resistance, are added in large amounts than the examples E1 to E5, thus leading to a difference in life.

Furthermore, as a type of steel which is used at such a location (place) as is particularly required to have core toughness, though it required a longer carburizing time as compared with the above described examples, Pyrowear 675 is known, and an example and a comparative example of the same are shown in Table 7 and Table 8.

A comparative example E20 which is formed of this type of steel and was subjected to the gas carburization had occurrence of uneven carburization, and showed a shorter life as a result of a life test conducted thereon, as can be expected from the Cr and V contents thereof which fall within the range of the present invention. On the other hand, an example E19 which was subjected to the acetylene vacuum carburization had no occurrence of uneven carburization and showed a longer life as a result of a life test conducted thereon.

Industrial Application

Since according to the method of manufacturing a rolling bearing of the present invention as claimed in claim 1, at least one of an inner ring, an outer ring, and a rolling element is manufactured from an alloy steel comprising 0.05 weight %–0.5 weight % carbon, 0.5 weight %–18 weight % chromium, 1.5 weight % or less silicon, 5 weight % or less molybdenum, 4.0 weight % or less vanadium, 4 weight % or less nickel, and 8 weight % or less tungsten, by subjecting the alloy steel to carburizing, hardening and tempering, wherein the carburizing is carried out by vacuum carburization. It is possible to manufacture a high-performance bearing formed of a heat-resisting carburized steel at a lower cost than the prior art without degradation in the strength due to formation of an intergranular oxide layer.

elements, at least one of said inner ring, outer ring and rolling elements being formed from an alloy steel comprising 0.05 weight %–0.5 weight % carbon, 4.0 weight %–18 weight % chromium, and 1.5 weight % or less silicon, the method comprising subjecting said at least one of said inner

TABLE 7

|  |  | STEEL TYPE | C | Si | Mn | Cr | Mo | W | V | Ni | Co | CARBURIZING METHOD | CARBURIZING GAS |
|---|---|---|---|---|---|---|---|---|---|---|---|---|---|
| PRESENT INVENTION EXAMPLE | E19 | Pyrowear675 | 0.05 | 0.4 | 0.6 | 13 | 1.75 | — | 0.6 | 2.5 | 5 | VACUUM CARBURIZATION | ACETYLENE |
| COMPARATIVE EXAMPLE | E20 | Pyrowear675 | 0.05 | 0.4 | 0.6 | 13 | 1.75 | — | 0.6 | 2.5 | 5 | GAS CARBURIZATION | Rx + PROPANE |

TABLE 8

|  | STEEL TYPE | HEAT TREATMENT | CARBURIZATION | ΔHRC | $L_{10}$ LIFE (×10$^6$) SEMI-HIGH TEMPERATURE |
|---|---|---|---|---|---|
| E19 | Pyrowear675 | A | ○ | 0.3 | 26.5 |
| E20 | Pyrowear675 | B | x | 22 | 2.4 |

Since according to a method of manufacturing a rolling bearing according to an embodiment of the present invention, the alloy steel includes 0.15 weight %–0.5 weight % carbon, and 2.2 weight %–18 weight % chromium, carburization of a high alloy steel can be carried out with ease without requiring special equipment and a number of steps as required in the conventional art. Further, since the carburizing is carried out in a vacuum (reduced pressure) atmosphere, formation of an intergranular oxide layer on the work surface, which was a disadvantage with the gas carburization, can be prevented, and as a result, a bearing having high fatigue strength can be provided at a low cost. Thus, it is possible to manufacture a high-performance bearing formed of a heat-resisting carburized steel at a lower manufacturing cost than in the prior art, without degradation in the strength due to formation of an intergranular oxide layer.

Since according to a method of manufacturing a rolling bearing according to an embodiment of the present invention, the alloy steel includes 0.05 weight %–0.5 weight % carbon, 0.5 weight %–18 weight % chromium, and 0.8 weight %–1.5 weight % silicon, the tempering softening resistance can be enhanced.

Since according to a method of manufacturing a rolling bearing according to an embodiment of the present invention, the alloy steel includes 0.05 weight %–0.5 weight % carbon, 0.5 weight %–18 weight % chromium, 0.3 weight %–1.5 weight % silicon, and 0.8 weight %–4.0 weight % vanadium, not only the tempering softening resistance can be enhanced, but also grindability (wear resistance) can be secured by virtue of formation of hard carbide.

Since according to a method of manufacturing a rolling bearing according to an embodiment of the present invention, the vacuum carburization is carried out by introducing acetylene, $CO_2O$ and $H_2O$ are not present in the carburizing atmosphere, to thereby enable restraint of formation of an oxide film.

What is claimed is:

1. A method of manufacturing a rolling bearing comprising an inner ring, an outer ring, and a plurality of rolling ring, outer ring and rolling elements to vacuum carburizing, hardening and tempering to provide a carburization ratio of 0.85 to 1.22.

2. The method of manufacturing a rolling bearing as claimed in claim 1, wherein the alloy steel includes 0.15 weight %–0.5 weight % carbon.

3. The method of manufacturing a rolling bearing as claimed in claim 1, wherein the alloy steel includes, 0.8 weight %–15 weight % silicon.

4. The method of manufacturing a rolling bearing as claimed in claim 1, wherein the alloy s teel includes 0.3 weight %–1.5 weight % silicon, and further comprises 0.8 weight %–4.0 weight % vanadium.

5. The method of manufacturing a rolling bearing as claimed in claim 1, wherein the vacuum carburization is carried out by introducing acetylene.

6. The method of manufacturing a rolling bearing as claimed in claim 2, wherein the vacuum carburization is carried out by introducing acetylene.

7. The method of manufacturing a rolling bearing as claimed in claim 3, wherein the vacuum carburization is carried out by introducing acetylene.

8. The method of manufacturing a rolling bearing as claimed in claim 4, wherein the vacuum carburization is carried out by introducing acetylene.

9. The method of manufacturing a rolling bearing as claimed in claim 1, wherein the alloy steel further comprises at least one element selected from the group consisting of 5 weight % or less molybdenum, 4.0 weight % or less vanadium, 4 weight % or less nickel and 8 weight % or less tungsten.

10. The method of manufacturing a rolling bearing as claimed in claim 9, wherein the vacuum carburization is carried out by introducing acetylene.

11. A rolling bearing comprising an inner ring, an outer ring and a plurality of rolling elements, at least one of said inner ring, outer ring and rolling elements being formed from an alloy steel comprising 0.05 weight %–0.5 weight % carbon, 4.0 weight %–18.0 weight % chromium and 1.5 weight or less silicon, by subjecting said at least one of said inner ring, outer ring, and rolling elements to carburizing, hardening and tempering to provide a carburization ratio of 0.85 to 1.22.

12. The rolling bearing as claimed in claim 11, wherein the alloy steel further comprises at least one element selected from the group consisting of 5 weight % or less molybdenum, 4.0 weight % or less vanadium, 4 weight % or less nickel and 8 weight % or less tungsten.

13. The rolling bearing as claimed in claim 11, wherein the alloy steel includes 0.15 weight % to 0.5 weight % carbon.

14. The rolling bearing as claimed in claim 11, wherein the alloy steel includes 0.8 weight % to 1.5 weight % silicon.

15. The rolling bearing as claimed in claim 12, wherein the alloy steel includes 0.3 weight % to 1.5 weight % silicon, and 0.8 weight % to 4.0 weight % vanadium.

16. The rolling bearing as claimed in claim 13, wherein the alloy steel includes 0.8 weight % to 1.5 weight % carbon.

17. The rolling bearing as claimed in claim 12, wherein the alloy steel includes 0.15 weight % to 0.5 weight % carbon.

18. The rolling bearing as claimed in claim 17, wherein the alloy steel includes 0.8 weight % to 1.5 weight % silicon.

19. The rolling bearing as claimed in claim 11, which has a hardness difference of 0.2 to 0.3.

* * * * *